Feb. 26, 1952 M. H. GROVE 2,586,942
APPARATUS FOR PREVENTING BACKFLOW OF LIQUID
Filed Nov. 8, 1947 3 Sheets-Sheet 1
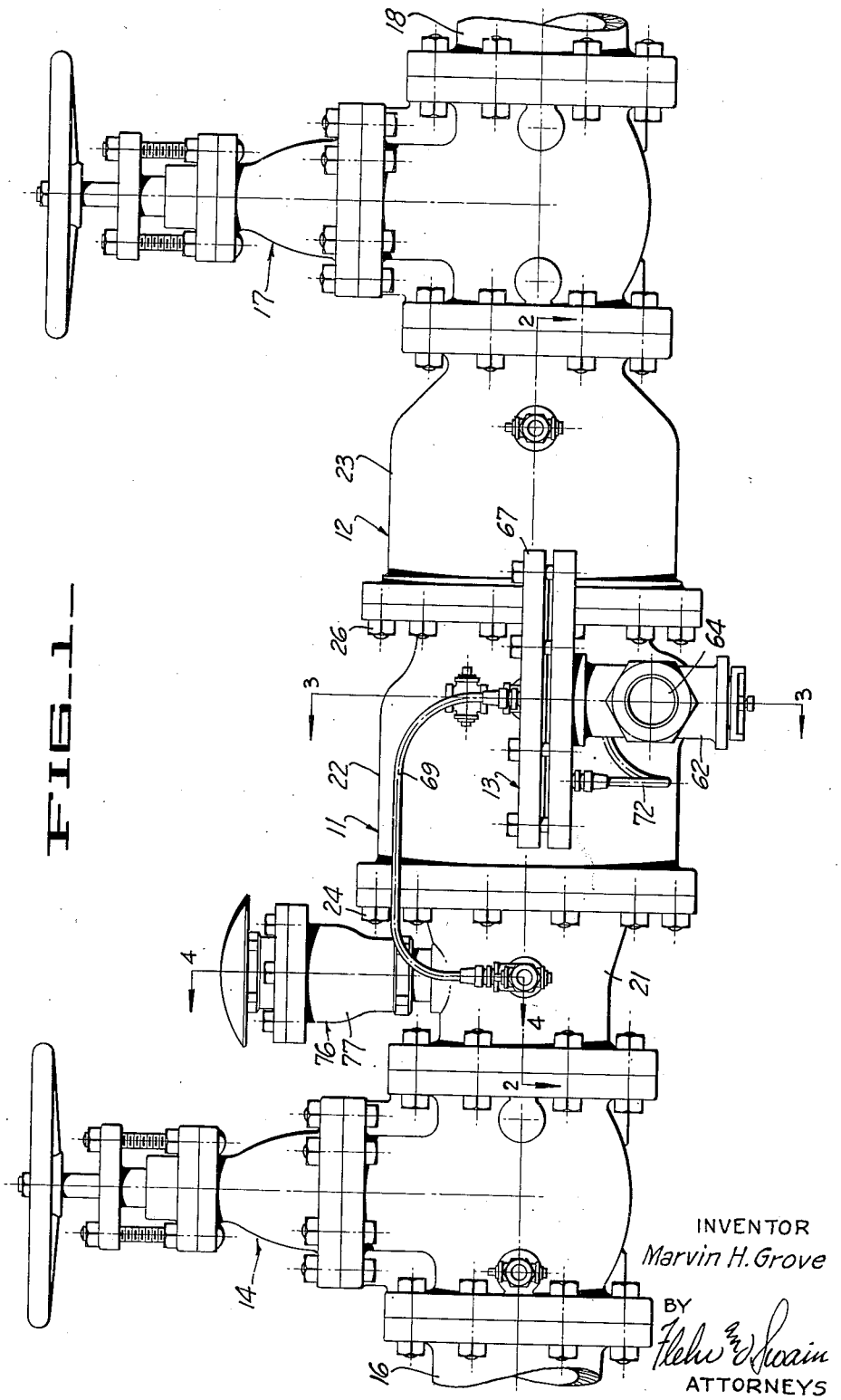

Feb. 26, 1952    M. H. GROVE    2,586,942
APPARATUS FOR PREVENTING BACKFLOW OF LIQUID
Filed Nov. 8, 1947    3 Sheets-Sheet 2
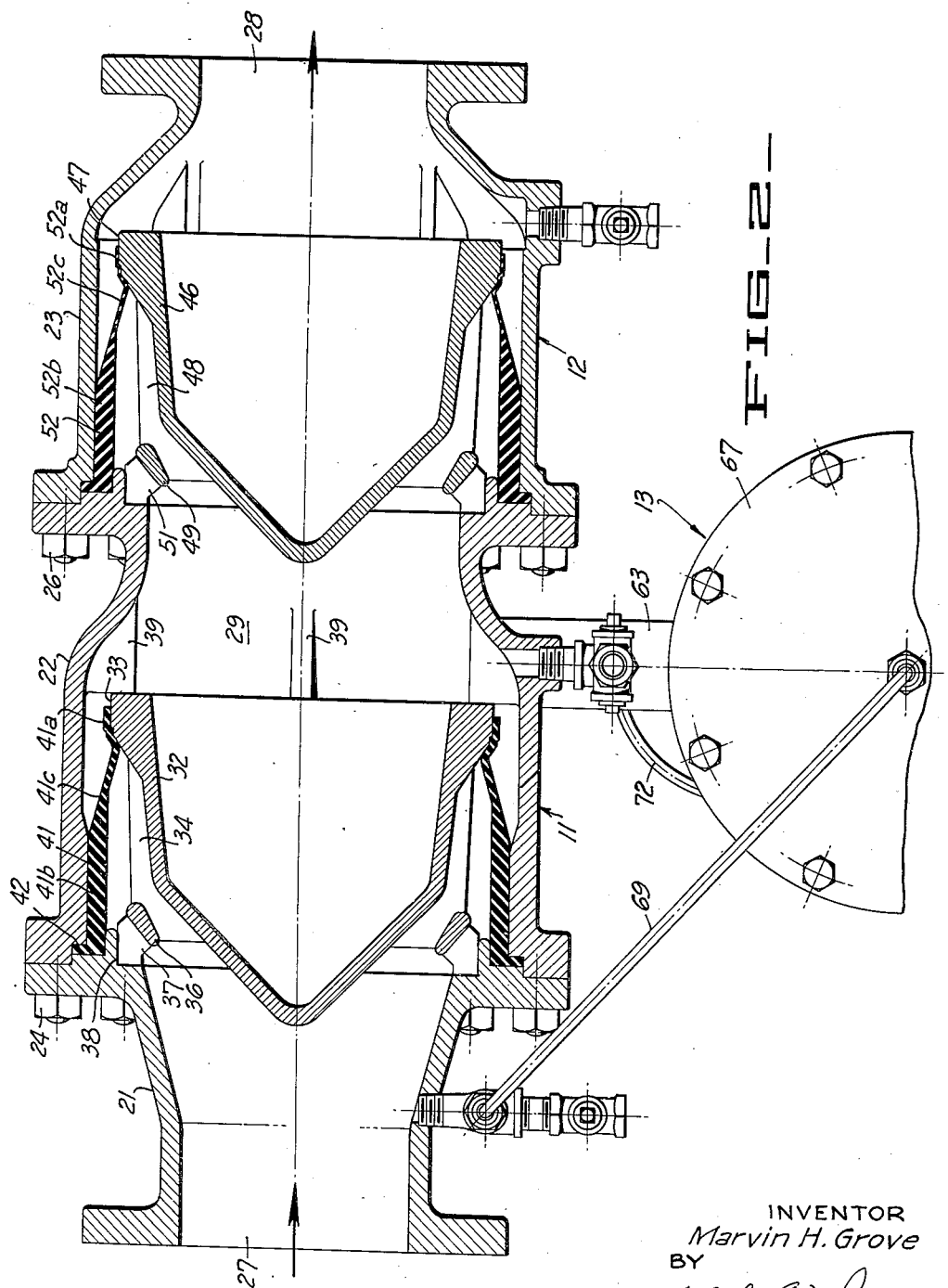
INVENTOR
Marvin H. Grove
BY
ATTORNEYS

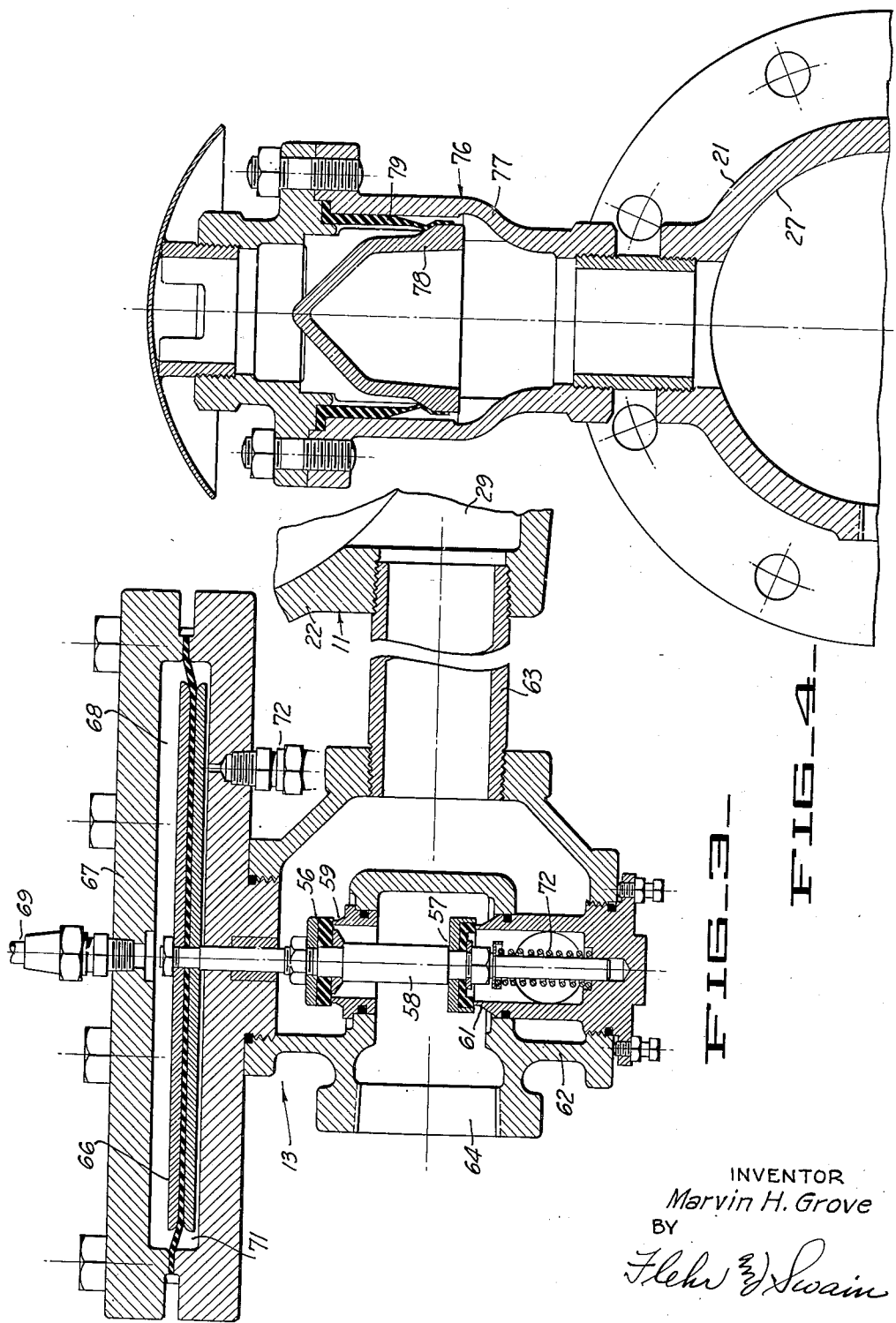

Patented Feb. 26, 1952

2,586,942

UNITED STATES PATENT OFFICE 2,586,942

APPARATUS FOR PREVENTING BACKFLOW OF LIQUID

Marvin H. Grove, Piedmont, Calif., assignor, by mesne assignments, to Grove Regulator Company, a corporation of California Application November 8, 1947, Serial No. 784,837

4 Claims. (Cl. 137—78)

This invention relates generally to apparatus for the purpose of preventing back flow of water from service or consumer piping to water supply mains.

Various types of apparatus have been used in conjunction with water supply systems for the purpose of preventing objectionable water contamination due to back flow of contaminated water for consumer piping to the water supply mains. One of the simplest types of apparatus to prevent such back flow consists of a check valve which opens to permit normal flow of water, and which closes in the event the consumer pressure equals or becomes greater than the supply pressure. In conjunction with such a check valve a vacuum breaker valve may also be connected to the inlet side of the same, thus serving to prevent sucking of contaminated water through the check valve due to a temporary subatmospheric pressure in the supply main.

With all of the more common types of check valves there is always some danger of leakage sufficient to cause serious contamination, due for example to an obstruction or mechanical failure which prevents proper closure. Therefore more elaborate apparatus which affords utmost safety makes use of two check valves connected in series between the water supply mains and the consumer piping in conjunction with an automatic unloading valve serving under certain conditions to vent the space between the check valves to the atmosphere. As usually installed and adjusted the unloading valve has fluid connections to both the space between the check valves and the water supply main, and serves to vent the space between the check valves to the atmosphere when the pressure in said space attains a value substantially equal to the inlet or water supply main pressure. With such apparatus it is assumed that no contamination of the water main can occur because the pressure upon the outlet side of the first check valve can in no event exceed the water main pressure.

Back flow preventing apparatus of the type last described has incorporated common types of check valves, which generally utilize rigid disc or flap valve members adapted to seal upon a stationary annular seat. When such a check valve is closed pressure variations upon the outlet side cannot be transmitted to the inlet side because the valve member and associated parts form in effect a rigid barrier between the inlet and outlet. Therefore an abnormal back pressure in the service or consumer piping cannot be transmitted to the space between said valves, during periods when no flow is occuring through the valves. In other words operation of the unloading valve can occur only when back flow leakage takes place through the second check valve. I have found that this reliance upon leakage is a distinct disadvantage, because it necessarily requires flow of contaminated water into the space between the check valves, and in addition it makes it necessary for the unloading operation to lag behind in attainment of abnormal pressure in the service or consumer piping, thus failing to afford the fullest amount of protection against back flow contamination.

It is an object of the present invention to provide apparatus for preventing back flow of water from water supply mains to service piping, making use of two check valves in conjunction with an automatic unloading valve as described above, but which will have the feature of causing unloading of the space between the check valves when an abnormal pressure condition occurs, without the necessity of leakage through the second check valve.

Another object of the invention is to provide apparatus of the above character which will afford improved protection against back flow contamination, and which will be highly reliable in its unloading operation.

Additional objects of the invention will appear from the following description in which the preferred embodiment has been set forth in detail in conjunction with the accompanying drawing.

Referring to the drawing:

Figure 1 is a side elevational view showing apparatus incorporating the invention.

Figure 2 is a plan view partly in section showing the two check valves and the unloading valve.

Figure 3 is a cross-sectional view taken along the line 3—3 of Figure 1.

Figure 4 is a cross-sectional view taken along the line 4—4 of Figure 1.

The apparatus illustrated in the drawings consists generally of a pair of serially connected check valves 11 and 12, in conjunction with an automatic venting or unloading valve 13. In actual commercial installations it is desirable to provide a hand operated valve 14 between the check valve 11 and the water supply piping 16. Likewise a hand operated valve 17 is connected between check valve 12 and the service or consumer piping 18. In a typical instance the pipe 18 is connected with service piping of an industrial plant, and the water carried by the same may be exposed to serious contamination. The purpose of my apparatus is to provide against back flow of such contaminated water from the pipe 18 to the pipe 16.

In place of utilizing check valves of conventional construction, I utilize valves of the type making use of a rubber sleeve having one end edge of the same adapted to seal upon a circular barrier. Thus the valves illustrated make use of three body parts 21, 22 and 23, which are coupled together by suitable means such as bolts 24 and 26. The inlet passage 27 formed by body part 21 is connected directly with the piping 16 through the hand valve 14, and the outlet passage 28 formed by body part 23 is directly connected with the piping 18 through hand valve 17. The connecting space 29 between the two check valves is formed by body part 22 and it is normally closed, except under certain pressure conditions as will be presently explained.

Mounted within the body part 22 there is an annular core 32 which is provided with an annular seat surface 33. The periphery of core 32 on the inlet side of sealing surface 33 is provided with spaced longitudinal ribs 34, which mount the annular support ring 36, and the positioning lugs 37. The lugs 37 are received within the annular recess 38 formed in the body part 21. The outlet end of the core 32 is engaged by the lugs 39, which are carried by the body part 22.

Surrounding the core 32 there is a resilient rubber sleeve 41 which has one end of the same provided with a flange 42, for enabling the same to be gripped between the two adjacent body parts. It is desirable that this rubber sleeve be made tapered as illustrated. Thus it is formed to provide a relatively thin wall portion 41a which is adapted to seal upon the surface 33, a relatively thick wall portion 41b which extends from the flange 42, and a tapered wall portion 41c which joins the relatively thin wall portion 41a with the thick wall portion 41b.

Normally when the resilient sleeve is not being acted upon by substantial differential pressure, the relatively thin wall portion 41a assumes a contracted position in sealing engagement with the annular surface 33. However, with application of substantial pressure to the inlet side of the check valve, the sleeve is expanded outwardly from the sealing surface 33, thus permitting flow of liquid. The differential pressure required to open this type of check valve is dependent in part upon the resiliency of the wall portion 41a. For the check valve 11 the rubber sleeve is selected to require a substantial differential pressure to open the same, as for example of the order of 3 to 4 p. s. i. However, for the check valve 12 the rubber sleeve is selected whereby the differential pressure required to open the same will be negligible, as for example of the order of from 0.3 to 0.5 p. s. i.

The working parts of the check valve 12 are substantially the same as for the check valve 11. The core 46, sealing surface 47, ribs 48, annular ring 49 and mounting tabs 51 can be substantially the same as the corresponding parts for check valve 11. The resilient rubber sleeve 52 likewise is constructed with a relatively thin wall portion 52a, a thick wall portion 52b and a tapered wall portion 52c. Because check valve 12 is arranged to open with negligible applied differential pressure, the wall portion 52a is relatively thin compared to wall portion 41a for the check valve 11.

The unloading or venting valve 13 can vary in specific design but should be constructed and operated in such a manner as to vent the space 29 when the pressure in this space reaches a value substantially equal to the pressure in the inlet passage 27, as for example within 0.5 p. s. i. of the inlet pressure. The particular unloading valve illustrated is provided with a fluid pressure operated diaphragm, and the chambers on opposite sides of the diaphragm are connected respectively with the inlet passage 27, and the intervening space 29.

To more specifically describe the unloading valve illustrated, a pair of valve members 56 and 57 are carried by the movable valve stem 58 and are adapted to close upon the seats 59 and 61 carried by the valve body 62. A pipe 63 connects the inlet side of this valve body to the space 29. The discharge passage 64 may connect to the atmosphere or to a convenient sewer.

The valve stem 58 is attached to a fluid pressure operated diaphragm 66 which is carried by the diaphragm mounting 67. Space 68 on one side of this diaphragm is connected by pipe 69 to the inlet passage 27. The space 71 upon the other side of the diaphragm is connected by pipe 72 with the space 29 intervening between the two check valves. A light compression spring 72 normally urges the valves 56 and 57 toward open position. The relationship between the fluid pressure areas on opposite sides of the diaphragm, in conjunction with the compression spring 72, is such that the valve members 56 and 57 remain closed when the pressure in inlet 27 is substantially greater than the pressure in space 29. However, if under abnormal conditions the pressure in space 29 should attain a value substantially equal to the pressure in inlet 27, then diaphragm 66 causes movement of the same to unseat the valve members 56 and 57, and thus permit venting or unloading of liquid in space 29.

In addition to the parts described above it is desirable to provide a so-called vacuum breaker valve in communication with the space 27. As illustrated in Figure 4, such a valve 76 can be a check valve constructed substantially the same as the check valves previously described. Thus the valve 76 includes a body 77 which is connected to the body part 21, an inner core 78, and a resilient sleeve 79 which normally seals upon the core 78. Subatmospheric pressure in space 29 causes the check valve 76 to open to the atmosphere.

Each of the check valves 11 and 12 has a peculiar characteristic not possessed by conventional types of check valves, such as are provided with a flap or like valve member closing upon a stationary annular seat. Considering the check valve 11, a substantial area of the rubber sleeve 41 forms in effect a flexible diaphragm which is interposed between the inlet and outlet passages. Assuming that some back pressure is applied after closure, the rubber tube is contracted inwardly to a smaller diameter, thus in effect increasing the outlet volume and decreasing the volume on the inlet side. The same is likewise true of the check valve 12. As will be presently explained this characteristic plays an important part in the mode of operation.

To describe the mode of operation of the apparatus, it will be presumed that it is connected substantially as illustrated in Figure 1 with both the manual valves 14 and 17 open, and with pipe 18 representing consumer piping such as may be employed in an industrial plant. In a typical instance the normal water main pressure may vary from say 60 to 90 p. s. i. Under all normal flow conditions a predetermined differential is maintained across the check valve 11, as for example a differential of the order of 3 or 4 p. s. i. As previously explained this differential is maintained because of the pressure required to expand the rubber tube 41. Assuming a reasonable rate of consumption from the service or consumer piping 18, both of the check valves will be held open by flow of liquid, and the unloading valve 13 will remain closed by virtue of the differential between the pressures applied to the diaphragm 66. Under abnormal conditions the pressure in the outlet passage 28 may equal or even exceed the inlet pressure applied to passage 27. As the pressure value in passage 28 approaches that in passage 27, both of the check valves 11 and 12 tend to close, and when the pressure in outlet 28 substantially equals the pressure in inlet 27, pressure is transmitted through the flexible sleeve 52 to the liquid in space 29, thus causing the pressure in space 29 to be substantially the same value. Application of such pressure from space 29 to the diaphragm 66 causes this diaphragm to move to open the valves 56 and 57, thus connecting space 29 to the atmosphere. If this condition should occur at a time when there is substantial pressure in the inlet 27, and if there is no back flow leakage past check valve 12, the differential pressure across check valve 11 will immediately be increased whereby unloading valve 13 immediately closes. Assuming that back pressure is applied from outlet 28 to a value equal to or greater than the pressure applied to inlet 27 and that there is improper closing of the check valve 12, abnormal pressure in the outlet 28 causes back leakage past the check valve 12, thus serving to maintain a pressure in space 29 at a value equal to the pressure in inlet 27. Under such conditions the unloading valve 13, after initial opening of the same, remains open to continuously vent such leakage from space 29. Thus back flow leakage past the check valve 12 can in no event reach the inlet 27.

If a temporary condition should occur in which no water is being consumed from the pipe 18, and the pressure applied to inlet 27 drops from normal by a margin slightly greater than the differential normally maintained across the check valve 11, the rubber tube 41 tends to collapse upon its core due to back flow pressure applied to the same. As a result the volume of space 29 is increased and the pressure in this space is relieved and caused to assume a value substantially less than that in the inlet. Therefore the unloading valve 13 is not affected, which is desirable because such a condition is not dangerous and does not threaten water contamination. Under like conditions using apparatus having check valves of conventional construction, the unloading valve would be subject to temporary false operation.

It will be evident from the foregoing that my apparatus not only provides for operation of the unloading valve during abnormal back pressure conditions when the second check valve fails to close properly, but in addition it connects the space between the check valves to the atmosphere under certain unsafe abnormal back pressure conditions, irrespective of actual leakage through the second check valve.

I claim:

1. In valve apparatus for preventing back flow of water from consumer piping to water supply piping, a first check valve having its inlet connected to the supply piping, said check valve requiring application of a substantial pressure differential to effect opening of the same, a second check valve having its inlet connected to the outlet of the first check valve and having its outlet connected to consumer piping, said second valve including a flexible diaphragm-like valve member interposed between the inlet and outlet passages of the same when the valve is closed and capable of substantial deflection after the valve is closed, an unloading valve movable between open and closed positions and connected to the space between said check valves, and means serving to operate said unloading valve responsive to a condition in which the pressure in said space attains a value substantially equal to the supply pressure, said flexible valve member of the second valve being capable of deflection to transmit back pressure in the consumer piping to the space between the check valves to thereby cause operation of the unloading valve.

2. In valve apparatus for preventing back flow of water from consumer piping to water supply piping, a first check valve having its inlet connected to the supply piping, said valve requiring a substantial predetermined differential pressure to open the same, a second check valve having its inlet connected to the outlet of the first check valve and its outlet connected to the consumer piping, said second valve including a flexible diaphragm-like member interposed between the inlet and outlet passages of the same when the valve is closed and serving when flexed to vary the volume of the space between the check valves, and valve means for effecting automatic venting of said space, said valve means having fluid connections with both said space and the water supply piping and operative to vent said space when the pressure in said space attains a value substantially equal to the pressure of the water supply, said flexible valve member of the second valve being capable of deflection to transmit back pressure in the consumer piping to the space between the check valves to thereby cause operation of the unloading valve.

3. A valve apparatus for preventing back flow of water from consumer piping to water supply piping, a first check valve having its inlet connected to the supply piping, said check valve requiring application of a substantial pressure differential to effect opening of the same, a second check valve having its inlet connected to the outlet of the first check valve and its outlet connected to the service piping, there being a closed space formed between said check valves, each of said check valves including a flexible diaphragm-like valve member interposed between the inlet and outlet passages of the same when the valve is closed and capable of flexing movement to vary the volumes of the spaces on opposite sides of the same, and unloading valve means connected to said closed space and having operative fluid connections to both said space and to the inlet side of the first check valve, said venting means serving to vent said space responsive to a pressure value in said space substantially equal to the pressure applied to the inlet of the first check valve, said flexible valve member of the second valve being capable of deflection to transmit back pressure in the consumer piping to the space between the check valves to thereby cause operation of the unloading valve.

4. A valve as set forth in claim 3, in which each of the check valves includes a resilient rubber tube forming said flexible diaphragm like member.

MARVIN H. GROVE.

REFERENCES CITED

The following references are of record in the file of this patent:

UNITED STATES PATENTS

| Number | Name | Date |
|---|---|---|
| 2,310,586 | Lohman | Feb. 9, 1943 |
| 2,328,118 | Ahlport | Aug. 31, 1943 |
| 2,389,412 | Carlton | Nov. 20, 1945 |